United States Patent
Chandrashekar

(10) Patent No.: US 11,902,382 B2
(45) Date of Patent: Feb. 13, 2024

(54) CLOUD MIGRATION BETWEEN CLOUD MANAGEMENT PLATFORMS

(71) Applicant: Hewlett Packard Enterprise Development LP, Houston, TX (US)

(72) Inventor: Charan Acharya Chandrashekar, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 808 days.

(21) Appl. No.: 16/428,924

(22) Filed: May 31, 2019

(65) Prior Publication Data

US 2020/0382610 A1     Dec. 3, 2020

(51) Int. Cl.
*H04L 67/148* (2022.01)
*H04L 67/1097* (2022.01)
(Continued)

(52) U.S. Cl.
CPC .......... *H04L 67/148* (2013.01); *H04L 63/083* (2013.01); *H04L 67/1097* (2013.01); *H04L 67/141* (2013.01); *H04L 67/306* (2013.01)

(58) Field of Classification Search
CPC ......... H04L 67/10; H04L 67/12; H04L 67/18; H04L 67/306; H04L 2209/38; H04L 67/22; H04L 9/3239; H04L 12/4625; H04W 4/38; H04W 4/40; H04W 4/029; H04W 4/021; H04W 4/026; G06F 9/542
See application file for complete search history.

(56) References Cited

U.S. PATENT DOCUMENTS 9,104,460 B2   8/2015   Jansen
9,246,765 B2   1/2016   Panuganty et al.
(Continued)

OTHER PUBLICATIONS

Ahmad, A.B. et al.; "SeaClouds: A European Project on Seamless Management of Multi-Cloud Applications"; Jan. 2014; 4 pages.
(Continued)

*Primary Examiner* — Michael A Keller
*Assistant Examiner* — Thao D Duong
(74) *Attorney, Agent, or Firm* — Mauriel Kapouytian Woods LLP

(57) ABSTRACT

Example techniques of migration of cloud networks between different multi-cloud management platforms, are described. In an example, a migration request is received. The migration request is indicative of a source multi-cloud management platform from which a cloud network is to be migrated to a destination multi-cloud management platform. The cloud network to be migrated from the source multi-cloud management platform to the destination multi-cloud management platform is identified based on a user input. Management platform information from the source multi-cloud management platform is obtained. The management platform information is representative of policies and data associated with the cloud network stored in databases of the source multi-cloud management platform. The cloud network is registered at the destination multi-cloud management platform. The management platform information is associated with the cloud network based on a unique identification number of the cloud network. The cloud network is deregistered from the source multi-cloud management platform.

20 Claims, 6 Drawing Sheets

(51) Int. Cl.
*H04L 9/40* (2022.01)
*H04L 67/141* (2022.01)
*H04L 67/306* (2022.01)

(56) References Cited

U.S. PATENT DOCUMENTS

| | | | |
|---|---|---|---|
| 2007/0038697 A1* | 2/2007 | Zimran | G06F 16/1827 709/203 |
| 2007/0220248 A1* | 9/2007 | Bittlingmayer | G06F 9/44505 713/100 |
| 2013/0346619 A1* | 12/2013 | Panuganty | H04L 41/12 709/226 |
| 2014/0344395 A1* | 11/2014 | Alexander | G06F 9/4856 709/217 |
| 2015/0012567 A1* | 1/2015 | Powell | G06F 16/188 707/809 |
| 2015/0263894 A1* | 9/2015 | Kasturi | H04L 41/0897 709/222 |
| 2015/0264128 A1* | 9/2015 | Huang | H04L 67/1006 709/203 |
| 2016/0092266 A1* | 3/2016 | Bavishi | G06F 9/52 718/1 |
| 2016/0154393 A1* | 6/2016 | Hund | G05B 15/02 700/275 |
| 2017/0104755 A1* | 4/2017 | Arregoces | H04L 67/10 |
| 2017/0371696 A1* | 12/2017 | Prziborowski | G06F 9/45558 |
| 2019/0121663 A1* | 4/2019 | Guo | G06F 9/5027 |
| 2020/0076689 A1 | 3/2020 | Chandrashekar | |
| 2020/0162318 A1* | 5/2020 | Patil | G06F 9/4416 |

OTHER PUBLICATIONS

BMC Software; "Multi-cloud Management"; printed on Aug. 31, 2018 from webpage: http://www.bmcsoftware.in/it-solutions/multi-cloud-management.html; 13 pages.
Netmagic; "Multi-cloud"; printed on Aug. 31, 2018 from webpage: https://www.netmagicsolutions.com/multi-cloud; 7 pages.
Amazon Web Services, "How CloudEndure Works", CloudEndure, 2019, pp. 1-7.
API Browser, "CloudAccounts", available online at <https://reference.rightscale.com/api1.6/index.html#/1.6/controller/V1_6-Definitions-CloudAccounts>, retrieved on Mar. 6, 2020, 3 pages.
BMC, "Achieve Cloud Migration Success", Solution White Paper, 2018, 11 pages.
BMC, "Policy class—Documentation for BMC Cloud Lifecycle Management 4.0—BMC Documentation", available online at <https://docs.bmc.com/docs/cloudlifecyclemanagement/40/developing/restful-api/api-reference/cloud-api-reference/policy-class>, 2005, 4 pages.
Cisco, "Cisco HyperFlex Systems", available online at <https://web.archive.org/web/20190912111710/https:/www.cisco.com/c/dam/en/us/products/se/2017/2/Collateral/le-56101-aag.pdf>, Sep. 12, 2019, 4 Pages.
GitHub, "x2js—XML to JSON and vice versa for JavaScript", available online at <https://web.archive.org/web/20190520043322/https://github.com/abdolence/x2js>, May 20, 2019, 5 pages.
HPE, "HPE GreenLake", available online at <https://web.archive.org/web/20180918072543/https://www.hpe.com/in/en/services/it-consumption.html>, Sep. 18, 2018, 9 pages.
HPE, "HPE Unveils Industry's First SaaS-Based Multi-Cloud Management Solution for On-Premises and Public Clouds", available online at < https://www.hpe.com/us/en/newsroom/press-release/2017/11/hpe-unveils-industrys-first-saas-based-multi-cloud-management-solution-for-on-premises-and-public-clouds.html>, Nov. 28, 2017, 13 pages.
Jessica Field, "Openstack Migrations with Gemini . . . Making Cloud Migrations Easy", Aptira, available online at <https://aptira.com/openstack-migration/>, May 4, 2017, 8 pages.
Juniper Networks, "Contrail Enterprise Multicloud", available online at <https://web.archive.org/web/20180425192950/https://www.juniper.net/us/en/products-services/sdn/contrail/contrail-enterprise-multicloud/>, Apr. 25, 2018, 7 pages.
Juniper Networks, "Contrail Enterprise Multicloud", available online at <https://www.juniper.net/assets/us/en/local/pdf/datasheets/1000637-en.pdf>, Engineering Simplicity, retrieved on Mar. 8, 2020, pp. 1-5.
RightScale API Docs "RightScale Policy API", available online at <https://reference.rightscale.com/governance-policies/#/>, retrieved on Mar. 6, 2020, 32 pages.
RightScale Docs, "Monitoring System", Cloud Management—Terminology and Concepts, available online at <https://web.archive.org/web/20180707043027/http://docs.rightscale.com/cm/rs101/monitoring_system.html>, Jul. 7, 2018, 4 pages.
Tobias Oetiker, "RRDtool—rrddump", Synonpsis, Oetiker+Partner AG, available online at <https://oss.oetiker.ch/rrdtool/doc/rrddump.en.html>, Feb. 4, 2019, 2 pages.
HPE, "HPE Helion OpenStack for HPE Integrity / HP-UX servers", available online at <https://web.archive.org/web/20170831232913/https:/h20392.www2.hpe.com/portal/swdepot/displayProductInfo.do?productNumber=Z7550-02095>, Nov. 2016, 2 pages.
HPE, "HPE OneSphere Hybrid Cloud Management Platform", available online at <https://web.archive.org/web/20180917070617/https:/www.hpe.com/in/en/solutions/cloud/hybrid-it-management.html>, Sep. 17, 2018, 12 pages.

* cited by examiner

SYSTEM 100

PROCESSOR(S) 102

MEMORY 104

[[RECEIVE A MIGRATION REQUEST, THE MIGRATION REQUEST BEING INDICATIVE OF A SOURCE MULTI-CLOUD MANAGEMENT PLATFORM FROM WHICH A CLOUD NETWORK IS TO BE MIGRATED TO A DESTINATION MULTI-CLOUD MANAGEMENT PLATFORM;

IDENTIFY, BASED ON A USER SELECTION, THE CLOUD NETWORK TO BE MIGRATED TO THE DESTINATION MULTI-CLOUD MANAGEMENT PLATFORM;

OBTAIN MANAGEMENT PLATFORM INFORMATION FROM THE SOURCE MULTI-CLOUD MANAGEMENT PLATFORM;

REQUEST CLOUD ACCOUNT DETAILS OF THE CLOUD NETWORK;

UPDATE A CLOUD REGISTRATION DATABASE IN THE DESTINATION MULTI-CLOUD MANAGEMENT PLATFORM WITH A CLOUD IDENTIFIER OF THE CLOUD NETWORK TO REGISTER THE CLOUD NETWORK IN THE DESTINATION MULTI-CLOUD MANAGEMENT PLATFORM;

ASSOCIATE THE MANAGEMENT PLATFORM INFORMATION WITH THE CLOUD NETWORK BASED ON A UNIQUE IDENTIFICATION NUMBER OF THE CLOUD NETWORK; AND

DEREGISTER THE CLOUD NETWORK FROM THE SOURCE MULTI-CLOUD MANAGEMENT PLATFORM
]]

Fig. 1

CLOUD MIGRATION BETWEEN CLOUD MANAGEMENT PLATFORMS

BACKGROUND

A cloud network enables communication between components in a cloud computing infrastructure and external users, applications, or services. Resources and operations of the cloud network are facilitated by the cloud computing infrastructure. A cloud network can enable connection between a remote user and a cloud application (Software as a Service) or a remote user and a cloud infrastructure (Infrastructure as a Service).

Multiple cloud networks and storage resources may be grouped in a single heterogeneous architecture referred to as a multi-cloud environment. In the multi-cloud environment, cloud assets, software, applications, etc., may be distributed across several cloud networks. The multi-cloud environment may include cloud networks or cloud hosting environments provided by different cloud service providers. In the multi-cloud environment, the cloud networks may be managed by a multi-could management platform. The multi-cloud management platform includes hardware, software, firmware, or a combination thereof which provides a unified interface for deployment, provisioning, and monitoring of different cloud networks in the multi-cloud environment.

BRIEF DESCRIPTION OF DRAWINGS

The following detailed description references the drawings, wherein:

FIG. 1 illustrates a system for migration of a cloud network between multi-cloud management platforms, according to an example;

DETAILED DESCRIPTION

Figure 2:
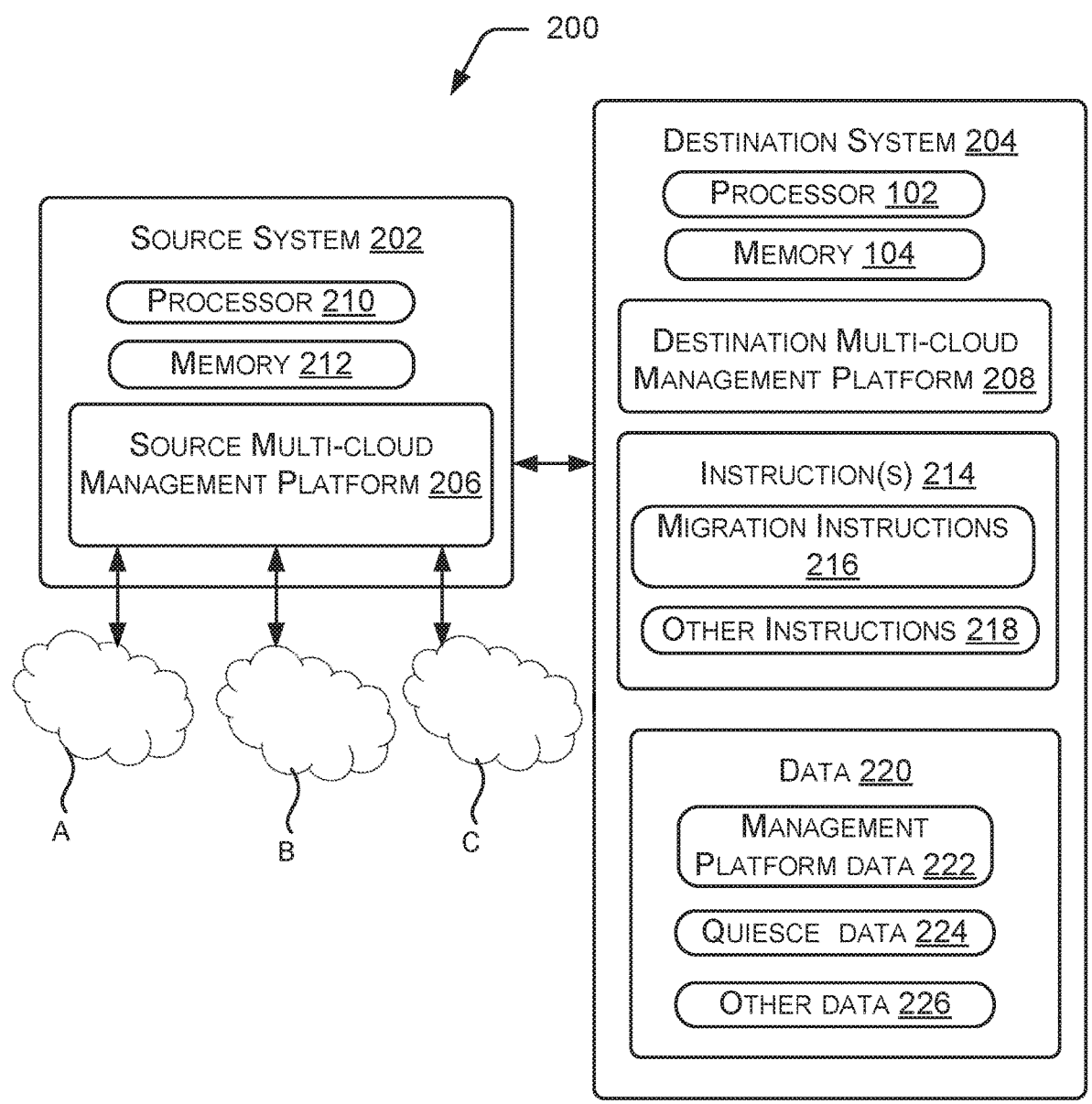
FIG. 2 illustrates a multi-cloud environment, according to an example.

A cloud network may include physical computing resources which may act as host systems, also called compute nodes. The cloud network may also include a storage pool formed of multiple storage systems which are part of the cloud network. Each compute node can deploy a hypervisor to enable multiple virtual machines (VMs) to be run on a single compute node. A compute node may thus provide storage, networking, memory, and processing resources that can be consumed by virtual machines (VMs) hosted by the compute node. A hypervisor or a virtual machine monitor (VMM) includes a computer software, firmware, hardware, or a combination thereof that can create and run VMs. Each VM running on a hypervisor can execute its own operating system and can be associated with a certain section of the storage pool. Each VM may run different applications and services. The hypervisor provides a virtual operating platform for the VMs, manages execution of the operating systems of the VMs, and enables sharing of virtualized hardware resources of the compute node among the VMs, such that different operating systems of different VMs can run on a single compute node.

In the multi-cloud environment, there may be multiple multi-cloud management platforms. Each of the multi-cloud management platforms may manage a specific set of cloud networks. The multi-cloud management platform managing a cloud network may collect data associated with the cloud network. The data may be related to processing resource usage, memory capacity usage, implementation policies, cloud logs, events, such as creation of workload, provisioning of resources, etc. of the cloud network.

A number of cloud networks managed by one multi-cloud management platform may be greater, as compared to the number of cloud networks managed by another multi-cloud management platform. The multi-cloud management platform managing more number of cloud networks, may suffer from performance and bandwidth issues due to heavy data traffic load. Hence, to balance data traffic load among different multi-cloud management platforms a cloud network may be migrated from one multi-cloud management platform to another multi-cloud management platform in the multi-cloud environment. Further, a cloud network managed by a multi-cloud management platform, subscription to which is high, may be migrated to another multi-cloud management platform which has reasonable subscription rates, to reduce expenditure on cloud service management. Also, when maintenance activity is carried out in a multi-cloud management platform, cloud networks managed by the multi-cloud management platform under maintenance may be migrated to another multi-cloud management platform in the multi-cloud environment. Therefore, cloud networks may be migrated between multi-cloud management platforms in the multi-cloud environment due to various reasons, such as, to balance data traffic load between multi-cloud management platforms, to enable maintenance activity on the multi-cloud management platforms, and due to cost concerns.

Generally, when a cloud network is migrated from a multi-cloud management platform A to a multi-cloud management platform B, data and policies associated with the cloud network stored in the multi-cloud management platform A may not be migrated to the multi-cloud management platform B along with associated resources of the cloud network. The data relating to the cloud network may include data on processing resource usage, memory capacity usage, policies, cloud logs, events, such as creation of workload, provisioning of resources, etc. of the cloud network. Policies of the cloud network refer to rules which govern access privileges, operations, resource allocation, etc., in the cloud network. Since the data and policies associated with the cloud network stored in the multi-cloud management platform A may not be migrated, thus, computing resources at the multi-cloud management platform B may not have access to such data and policies which may be lost. As a result, after migration of the cloud network to the multi-cloud management platform B, predefined policies of the cloud network may not be implemented in the multi-cloud management platform B. Re-creation and re-implementation of these policies may be time consuming and expensive, may involve substantial manual efforts and may be prone to errors. Also, after migration of the cloud network, the data associated with the cloud network may not be available to the multi-cloud management platform B to obtain analytical insights for management and monitoring of the cloud network.

Further, migration of a cloud network between multi-cloud management platforms may result in downtime to Virtual Machines (VMs) or application(s) hosted in the cloud network being migrated. In cases when multiple cloud networks managed by a multi-cloud management platform is to be migrated to another multi-cloud management platform, generally, each cloud network is individually migrated to the other cloud network. Migrating each cloud network individually involves downtime for each cloud network which may result each of the cloud networks to remain in an offline state during the migration. The offline state refers to a condition, when resources of the cloud network is unavailable to receive requests or commands from users and network administrators. While the cloud network is in the offline state, resources of the cloud network may not be available to receive and handle requests relating to update of the VMs or its associated network and storage. Thus, the downtime in migrating multiple cloud networks from one multi-cloud management platform to another multi-cloud management platform may be higher as the number of cloud networks to be migrated increases. Further, such migration involves a network administrator's manual effort in identifying the cloud networks to be migrated, individually migrating each of the identified cloud networks to the other multi-cloud management platform, and reallocating or reassigning storage and network resources to the individual cloud networks after migration.

The present disclosure describes approaches in which, a cloud network may be migrated from a source multi-cloud management platform to a destination multi-cloud management platform without loss of data associated with the cloud network stored in the source multi-cloud management platform. The data associated with the cloud network stored in the source multi-cloud management platform is also transferred to the destination multi-cloud management platform which can use the data for management and monitoring of the cloud network. Also, in accordance with the present disclosure, multiple cloud networks may be migrated from the source multi-cloud management platform to the destination multi-cloud management platform, collectively. Thus, the network administrator's manual efforts in identifying each of the multiple cloud networks individually, registering them in the destination multi-cloud management platform, and individually assigning processing and storage resources to each of them may be reduced. Consequently, complexity and manual effort in migrating all the cloud networks managed by one multi-cloud management platform to another multi-cloud management platform may be reduced.

The present disclosure relates to migration of a cloud network managed by a multi-cloud management platform to another multi-cloud management platform. According to the present disclosure, a migration request indicative of a source multi-cloud management platform from which the cloud network is to be migrated to a destination multi-cloud management platform is received. In an example, the migration request is received at a compute node which hosts the destination multi-cloud management platform. The cloud network to be migrated from the source multi-cloud management platform to the destination multi-cloud management platform may be identified based on a user input. Management platform information is obtained from the source multi-cloud management platform. The management platform information is representative of policies and data associated with the cloud network identified for migration which are stored in databases of the source multi-cloud management platform. Policies of the cloud network refer to rules which govern access privileges, operations, resource allocation, etc., in the cloud network(s). The cloud network identified for migration is registered at the destination multi-cloud management platform and the management platform information corresponding to the cloud network is associated with the cloud network. In response to the cloud network being registered at the destination multi-cloud management platform, the management platform information is associated with the cloud network based on a unique identification number of the cloud network. The cloud network is then deregistered from the source multi-cloud management platform.

Thus, the management platform information associated with the migrated cloud network is also transferred and associated with the cloud network at the destination multi-cloud management platform. Hence, data and policies associated with the migrated cloud network which was stored in the databases of the source multi-cloud management platform is not lost. The management platform information associated with the migrated cloud network may be used by the destination multi-cloud management platform for monitoring and management of the migrated cloud network. Further, multiple cloud networks and management platform information associated with each of the multiple cloud networks may be migrated according to the present disclosure, without involving manual efforts of the network administrator in individually identifying the cloud networks to be migrated, individually registering each of the identified cloud networks at the destination multi-cloud management platform, and reallocating or reassigning storage and network resources to the individual cloud networks after migration.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a system 100 for migration of a cloud network between multi-cloud management platforms, according to an example. The system 100 may be an electronic device, such as a desktop, a laptop, a tablet, a handheld device, etc., capable of processing computer readable instructions. In an example, the system 100 may be a computer running a multi-cloud management platform in a multi-cloud environment.

The system 100 includes a processor 102 and a memory 104 coupled to the processor 102. The memory 104 stores instructions executable by the processor 102. In an example, the instructions when executed by the processor cases the processor to implement the multi-cloud management platform in the multi-cloud environment. The instructions when executed by the processor 102 cause the processor 102 to receive a migration request from a network administrator. In an example, the migration request may be received through a Graphical User Interface (GUI) or Command Line Interface (CLI) of the multi-cloud management platform. The migration request indicates a source multi-cloud management platform from which a cloud network is to be migrated to a destination multi-cloud management platform. In an example, a unique identifier associated with the source multi-cloud management platform may be mentioned in the migration request. The unique identifier associated with the source multi-cloud management platform may be a name, a Globally Unique Identifier (GUID), or a combination thereof. In an example, a unique identifier of a cloud network to be migrated may also be mentioned in the migration request.

In response to receiving the migration request, the instructions when executed by the processor 102 cause the processor 102 to identify the cloud network to be migrated to the destination multi-cloud management platform based on a user input. In an example, a network administrator may provide the user input by selecting the cloud network to be migrated in a graphical User Interface (GUI). The network administrator may also mention a unique identifier of the cloud to be migrated in a Command Line interface (CLI).

Further, the instructions when executed by the processor 102 cause the processor 102 to obtain Management platform information from the source multi-cloud management platform. The management platform information is representative of policies and data associated with the cloud network stored in databases of the source multi-cloud management platform. Examples of data associated with the cloud network which may be stored in the databases of the source multi-cloud management platform may include cloud telemetry data, cloud log data, events data, and alarms data. The cloud telemetry data is indicative of usage of computing and network resources by the cloud network. Thus, the cloud telemetry data may include data representative of processor usage, memory usage, network usage, billing information, or the like. The cloud log data may include data related to occurrence of different operations, such as creation/modification of a VM, addition of a storage resource, modification of networking resources etc., in the cloud network. Events data is representative of a list or log of occurrences of specific operations which the cloud network is preconfigured to monitor. For example, the instances in which processing resource usage of the cloud network reaches a predefined threshold may be recorded as an event and stored in the events data. Alarms data is representative of warnings to be generated by the cloud network under certain predefined conditions. For example, if the number of VMs running in the cloud network reaches above a predefined threshold, the cloud may be configured to generate an alarm. This information may be stored in the alarms data. In an example, the management platform information for the cloud network to be migrated may be fetched from the source multi-cloud management platform. Policies of the cloud network refer to rules which govern access privileges, operations, resource allocation, etc., in the cloud network managed by the source multi-cloud management platform. The policies may be created/modified by a network administrator. For example, a policy created in the multi-cloud management platform may "allow user 'A' to create a VM instance on a single cloud network managed by the multi-cloud management platform". Another example policy may be to "delete unattached storage volumes in a cloud network managed by the multi-cloud management platform after 24 hours".

The instructions when executed by the processor 102 further cause the processor 102 to register the cloud network at the destination multi-cloud management platform and associate the management platform information to the cloud network based on a unique identification number of the cloud network. In an example, the instructions when executed by the processor 102 cause the processor 102 to request cloud account details of the cloud network. In an example, the network administrator (admin) may provide the cloud account details. The cloud account details are indicative of data for authentication of a user account through which computing resources of the cloud network is accessible. The databases and processing resources of the cloud network may be accessed after logging in into the cloud network using the cloud account details. Examples of the cloud account details include a username, a password, or some other form of key.

The instructions when executed by the processor 102 further cause the processor 102 to update a cloud registration database in the destination multi-cloud management platform with a cloud identifier of the cloud network. Once the cloud identifier of the cloud network is included in the cloud registration database of the destination multi-cloud management platform, the cloud network gets registered in the destination multi-cloud management platform. The cloud registration database of the destination multi-cloud management platform stores a list of cloud identifiers, each corresponding to one of a plurality of cloud networks managed by the destination multi-cloud management platform. In an example, cloud identifiers may refer to GUIDs or names of cloud networks which identifies the cloud network. The instructions when executed by the processor 102 further cause the processor 102 to deregister the cloud network from the source multi-cloud management platform.

Since, according to the present disclosure, the management platform information is also transferred to the destination multi-cloud management platform and associated with the migrated cloud network, therefore, loss of data and policies associated with the migrated cloud network may be prevented. Consequently, the management platform information of the migrated cloud network may be utilized for monitoring and management of the cloud network at the destination multi-cloud management platform.

FIG. 2 illustrates a multi-cloud environment 200 according to an example. The multi-cloud environment 200 includes a first system 202 and a second system 204. The first system 202 hosts a first multi-cloud management platform 206 and the second system 204 hosts a second multi-cloud management platform 208. The first system 202 and the second system 204 may be connected over a network, such as a private network or a public network. The first multi-cloud management platform 206 and the second multi-cloud management platform 208 can manage cloud networks. In an example, the first multi-cloud management platform 206 may be provided by a first cloud service provider and the second multi-cloud management platform 206 may be provided by a second cloud service provider.

As shown in FIG. 2, the first multi-cloud management platform 206 manages a first cloud network A, a second cloud network B, and a third cloud network C. Thus, the first multi-cloud management platform 206 may collect data relating to the cloud networks A, B, and C, and store and analyze the data for cloud management. Examples of the data relating to the cloud networks include telemetric data, cloud logs, alarms, event data, etc. of the cloud networks A, B, and C. The cloud networks A, B, and C have cloud hosting capabilities. In an example, the first cloud network A, the second cloud network B, and the third cloud network C may be provided by different service providers. In an example, the cloud networks A, B, and C may be one of a public cloud, a private cloud, and a hybrid cloud.

Consider that a cloud network managed by the first multi-cloud management platform 206 is to be migrated to the second multi-cloud management platform 208. Thus, the first multi-cloud management platform 206 is also referred to as a source multi-cloud management platform 206 and the second multi-cloud management platform 208 is referred to as a destination multi-cloud management platform 208. Thus, the first system 202 may be referred to as a source system 202 and the second system may be referred to as a destination system 204.

Further, as shown in FIG. 2, the source system 202 includes a processor 210 coupled to a memory 212 and the destination system 204 includes a processor 102 coupled to a memory 104. The processor(s) 210 and 102 may be implemented as microprocessors, microcomputers, microcontrollers, digital signal processors, central processing units, state machines, logic circuitries, and any devices that manipulate signals based on operational instructions. Among other capabilities, the processors 210 and 102 are configured to fetch and execute computer-readable instructions stored in the memories 212 and 104, respectively. The computer-readable instructions, also referred to as instructions, includes instructions 214. The instructions 214 may include routines, programs, components, applications, data structures, and the like, which perform particular tasks or implement particular abstract data types. The instructions, being executable by the processor(s), may also be referred to as processor-executable instructions. The execution of the instructions to perform a function may be interchangeably referred to as the instructions causing performance of the function or the instructions enabling performance of the function.

The functions of the various elements shown in the FIG. 2, including any functional blocks labeled as "processor(s)", may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and custom, may also be included.

The memories 212 and 104 may include any computer-readable medium known in the art including, for example, volatile memory (e.g., RAM), and/or non-volatile memory (e.g., EPROM, flash memory, etc.). The instruction(s) 214 include migration instruction(s) 216 which corresponds to instructions stored on a computer-readable medium and executable by a processor to enable migration of cloud network(s) from the source multi-cloud management platform 206 to the destination multi-cloud management platform 208. The instruction(s) 214 also comprise other instruction(s) 218 that supplement applications on the destination system 204, for example, execution of functions of an operating system.

Data 220 serves, amongst other things, as a repository for storing data that may be fetched, processed, received, or generated by the instruction(s) 214. The data 220 includes management platform data 222 which stores data fetched from the source multi-cloud management platform 206, where the data relates to cloud networks managed by the source multi-cloud management platform 206 and quiesce data 224 which stores data relating to cloud network update requests received by the destination multi-cloud management platform 208. The data 220 also comprises other data 226 that may be fetched, processed, received, or generated during execution of other instruction(s) 218. Although in FIG. 2, instructions 214 and data 220 are shown to be external to the destination multi-cloud management platform 208, in an example, the instructions 214 and the data 220 may reside within the destination multi-cloud management platform 208.

Consider that a network administrator, also referred to as an admin, intends to migrate the first cloud network A, also referred to as cloud A, from the source multi-cloud management platform 206 to the destination multi-cloud management platform 208. Although the following description is provided with reference to migration of a single cloud network from a source multi-cloud management platform to a destination multi-cloud management platform, the description is applicable mutatis mutandis for migration of multiple cloud networks from one multi-cloud management platform to another multi-cloud management platform.

In operation, the migration instructions 216 when executed by the processor 102, cause the processor 102 to receive a migration request from the admin. The admin may provide the migration request through a GUI or CLI launched due to execution of the migration instructions 216 at the destination system 204. The migration request is indicative of a source multi-cloud management platform from which a cloud network is to be migrated to a destination multi-cloud management platform. In an example, the migration request may include a name or unique identifier of the source multi-cloud management platform 206. Based on the migration request the source multi-cloud management platform 206 may be identified.

In response to the migration request being received, the migration instructions 216 when executed by the processor 102, cause the processor 102 to request user login credentials associated with the source multi-cloud management platform 206. The user login credentials is indicative of data for authenticating a user account in the source multi-cloud management platform 206. Once the user account is authenticated, databases of the source multi-cloud management platform may be accessed.

In response to the source multi-cloud management platform 206 being identified, the migration instructions 216 when executed by the processor 102, cause the processor 102 to invoke an instruction set corresponding to the identified source multi-cloud management platform 206 for migrating cloud networks from the identified source multi-cloud management platform 206. The instruction set (not shown) resides within the migration instructions 216 and enables Application Programming interfaces (APIs) exposed by the source multi-cloud management platform 206 to be accessed and invoked from the destination multi-cloud management platform 208. The instruction set, when executed by the processor 102 may invoke appropriate APIs of the identified source multi-cloud management platform 206 for migration. Since different multi-cloud management platforms may be hosted by different cloud service providers, therefore, the migration instructions 216 includes different instruction sets for invoking APIs in the different multi-cloud management platforms. Thus, once the source multi-cloud management platform is identified from the migration request, the migration instructions 216, based on the cloud service provider of the identified source multi-cloud management platform, may invoke a corresponding instruction set for migration.

The migration instructions 216 when executed by the processor 102, further cause the processor 102 to identify the cloud network to be migrated from the source multi-cloud management platform 206 to the destination multi-cloud management platform 206 based on a user input. In an example, the user input may be provided by the admin. The migration instructions 216 may cause a GUI or CLI to be launched, where the admin may select the cloud network to be migrated. Consider that the admin selects the cloud A for migration. Thus, it is identified that cloud A is to be migrated from the source multi-cloud management platform 206 to the destination multi-cloud management platform 208. In an example, all the cloud networks A, B, and C may also be selected by the admin.

In a scenario where the admin selects to migrate all the clouds that are registered under the source multi-cloud management platform 206, the migration instructions 216 may cause the processor 102 to access the source multi-cloud management platform 206 and obtain a list of clouds managed by the source multi-cloud management platform 206. In an example, the migration instructions 216 may invoke a Representational State Transfer (REST) Application Programming Interface (API) provided by the source management platform 206 to obtain the list of clouds registered at the source multi-cloud management platform 206.

In response to the cloud network being identified, the migration instructions 216 when executed by the processor 102, cause the processor 102 to obtain management platform information from the source multi-cloud management platform 206. In an example, the management platform information may be fetched from databases of the source multi-cloud management platform. The management platform information is representative of policies and data associated with the cloud network. The management platform information is stored in databases of the source multi-cloud management platform.

In an example, if multiple cloud networks are identified for migration, the policies associated with each of the identified cloud networks may be fetched from the source multi-cloud management platform 206. In an example, the migration instructions 216 may invoke a REST API at the source multi-cloud management platform 206 to obtain policies associated with all the clouds registered under the source multi-cloud management platform 206.

After obtaining the policies, the migration instructions 216 may cause the processor 102 to check if data associated with the cloud network is stored in databases of the source multi-cloud management platform 206. On determining that data associated with the cloud network is present in the databases of the source multi-cloud management platform 206, the migration instructions 216 may enable the data to be exported in a data format supported by source multi-cloud management platform 206. In an example, the data related to all the registered cloud networks may be exported to the destination multi-cloud management platform 208 in an Extensible Markup language (XML) file format. Thus, management platform information may be obtained from the source multi-cloud management platform 206.

In response to obtaining the management platform information, the migration instructions 216 when executed by the processor 102, may cause the processor 102 to set up the destination multi-cloud management platform in a quiesce mode. In the quiesce mode, requests related to deployment and modification of computing resources in the cloud network A received at the destination multi-cloud management platform 208 are paused from being processed. In the quiesce mode, the destination multi-cloud management platform 208 remains in an online state and is available to receive requests related to update of computing resources of the cloud A. However, such requests received in the quiesce mode are paused from execution. The requests received by the destination multi-cloud management platform 208 while it is in the quiesce mode are called quiesced requests. The quiesced requests may be stored and queued up in a database of the destination system 204. The quiesced requests may be executed by the processor 102 after the cloud A is migrated to the destination multi-cloud management platform 208. Thus, during migration of the cloud A from the source multi-cloud management platform 206 to the destination multi-cloud management platform 208, the destination multi-cloud management platform 208 is in the online state and is available to receive requests related to update of computing resources of the cloud A.

The migration instructions 216 when executed by the processor 102, may cause the processor 102 to request cloud account details of the cloud network A which is identified for migration. The cloud account details are indicative of data for authentication of a user account through which computing resources of the cloud network A is accessible. In an example, the migration instructions 216 may launch a CLI and the admin may provide the cloud account details, such as username and password.

The migration instruction 220 may further cause a cloud registration database in the destination multi-cloud management platform 208 to be updated to include a cloud identifier of the cloud network A. In an example, the cloud identifier may be name or GUID of the cloud network A to be migrated. The cloud registration database stores a list of cloud identifiers, each corresponding to one of a plurality of cloud networks managed by the destination multi-cloud management platform 208. In an example, when multiple cloud networks are identified for migration to the destination multi-cloud management platform 208, corresponding cloud network identifiers of the cloud networks may be included in the cloud registration database. In an example, the migration instructions 216 may invoke an API of the destination multi-cloud management platform to update the cloud registration database of the destination multi-cloud management platform 208. Once, the cloud identifier of the cloud A is included in the cloud registration database of the destination multi-cloud management platform 208, the cloud A may be understood to be registered with the multi-cloud management platform 208.

In response to the cloud network A being registered at the destination multi-cloud management platform, the migration instructions 216 may enable conversion of the management platform information to a format supported by the destination multi-cloud management platform 208. In an example, the management platform information may be converted to an XML or JavaScript Object Notation (JSON) format. The migration instructions 216 may enable the converted management platform information to be stored in a database of the destination multi-cloud management platform 208. Once the management platform information is stored in the destination multi-cloud management platform 208, the management platform information is associated with the cloud network A based on the unique identification number of the cloud network A. In an example, the management platform information may be linked to the cloud network A based on one of a name and cloud id of the cloud A.

Further, the migration instructions 216 when executed by the processor 102 may cause the processor 102 to implement the policies represented by the management platform information in the destination multi-cloud management platform 208. In an example, the migration instructions 216 when executed by the processor 102, causes the processor 102 to invoke a REST API to implement the policies represented by the management platform information at the destination multi-cloud management platform 208.

In response to the policies being implemented at the destination multi-cloud management platform 208, the migration instructions 216 cause the cloud network A to be deregistered from the source multi-cloud management platform 206. In an example, the migration instructions 216 may invoke an instruction set corresponding to the source multi-cloud management platform 206 to access APIs and databases of the source multi-cloud management platform 206. In an example, the migration instructions 216 when executed by the processor 102, causes the processor 102 to invoke the instruction set corresponding to the source multi-cloud management platform 206. In an example, the instruction set may invoke a REST API at the source multi-cloud management platform 206 to deregister the cloud network from the source multi-cloud management platform 206.

In response to the cloud network A being deregistered from the source multi-cloud management platform 206, the migration instructions 216 enable processing of the quiesced requests. The quiesced requests, received at the destination multi-cloud management platform 208, are related to deployment and modification of computing resources in the cloud network A. Further, the migration instructions 216 enable generation of a migration successful message indicative of completion of migration of the cloud network A from the source multi-cloud management platform 206 to the destination multi-cloud management platform 208, once the cloud network A is deregistered from the source multi-cloud management platform 206.

Figure 3:
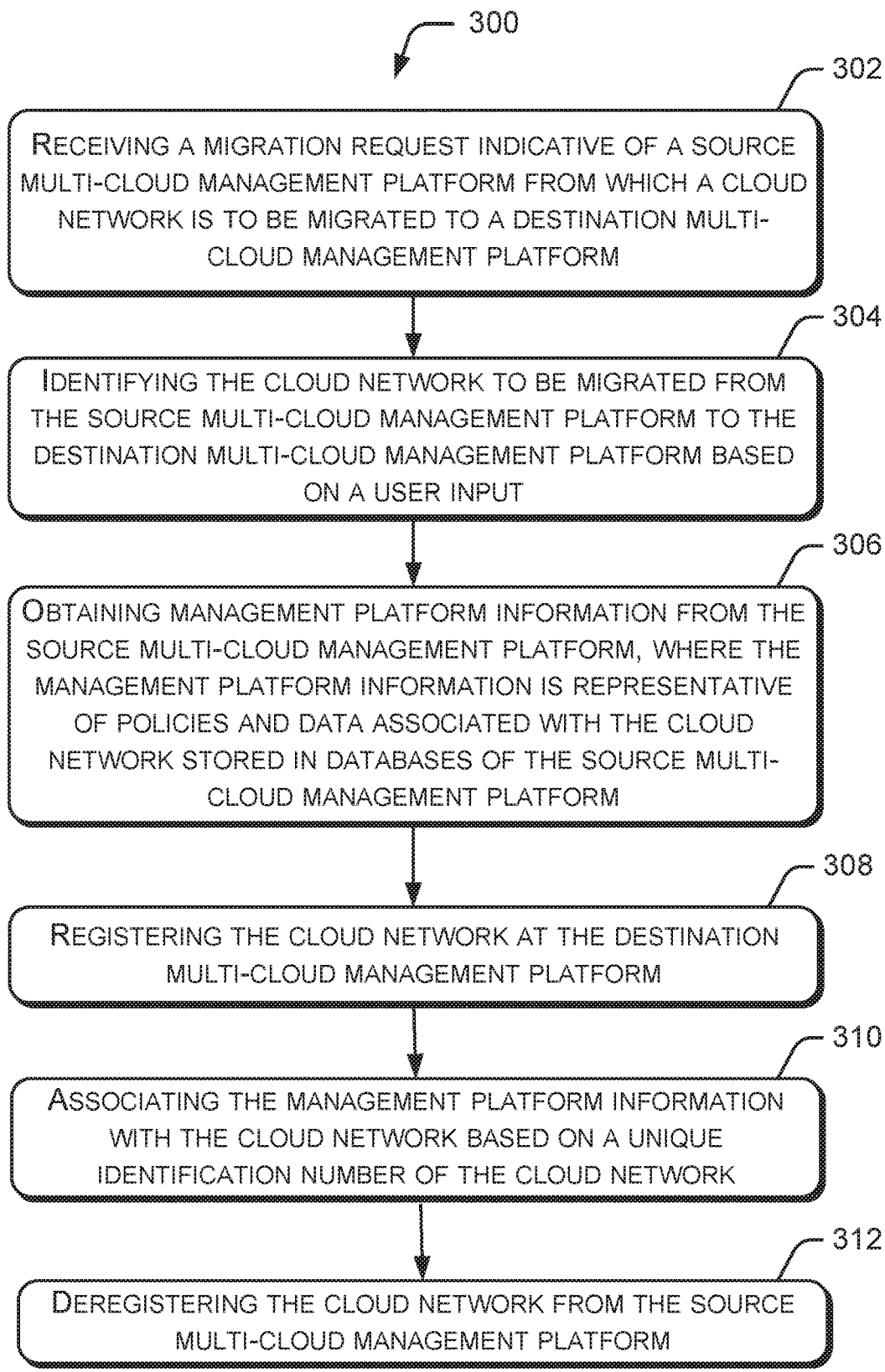
FIG. 3 illustrates a method for migration of a cloud network between multi-cloud management platforms, according to an example.

FIG. 3 illustrates a method 300 for migration of a cloud network between multi-cloud management platforms, according to an example. The method 300 enables migration of a cloud network from a source multi-cloud management platform, such as the source multi-cloud management platform 206, to a destination multi-cloud management platform, such as the destination multi-cloud management platform 208. The method 300 can be implemented by processing resource(s) or computing device(s) through any suitable hardware, a non-transitory machine readable medium, or combination thereof. In an example, step(s) of the method 300 may be performed by execution of computer-readable instructions, such as the migration instructions 216 which includes instructions stored on a medium and executable by a processing resource, such as the processor 102, of a system, such as the system 100 or 204. Further, although the method 300 is described in context of the aforementioned system 100 or 204, other suitable systems may be used for execution of the method 300. It may be understood that processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 3, at block 302, a migration request is received by a processor, such as the processor 102, of a system, such as the system 100 or 204. The migration request indicates a source multi-cloud management platform, such as the source multi-cloud management platform 206, from which a cloud network, such as the cloud network A, is to be migrated to a destination multi-cloud management platform, such as the destination multi-cloud management platform 208. In an example, the migration request may include a unique identifier associated with the source multi-cloud management platform. The unique identifier associated with the source multi-cloud management platform may be a name, a Globally Unique Identifier (GUID), or a combination thereof. In an example, a unique identifier of a cloud network to be migrated may also be mentioned in the migration request.

At block 304, the cloud network to be migrated to the destination multi-cloud management platform is identified based on a user input. In an example, a network administrator may provide the user input by selecting the cloud network to be migrated in a graphical User Interface (GUI). The network administrator may also mention a unique identifier of the cloud to be migrated in a Command Line interface (CLI).

At block 306, management platform information from the source multi-cloud management platform is obtained. The management platform information is representative of policies and data associated with the cloud network stored in databases of the source multi-cloud management platform. Examples of data associated with the cloud network which may be stored in the databases of the source multi-cloud management platform may include cloud telemetry data, cloud log data, events data, and alarms data. Policies of the cloud network refer to rules which govern access privileges, operations, resource allocation, etc., in the cloud network managed by the source multi-cloud management platform.

At block 308, the cloud network is registered at the destination multi-cloud management platform. At block 310, the management platform information is associated to the cloud network based on a unique identification number of the cloud network. At block 312, the cloud network is deregistered from the source multi-cloud management platform.

In an example, in response to deregistering the cloud network from the source multi-cloud management platform, a migration successful message indicating completion of migration of the cloud network from the source multi-cloud management platform to the destination multi-cloud management platform may be generated.

Figure 4A:
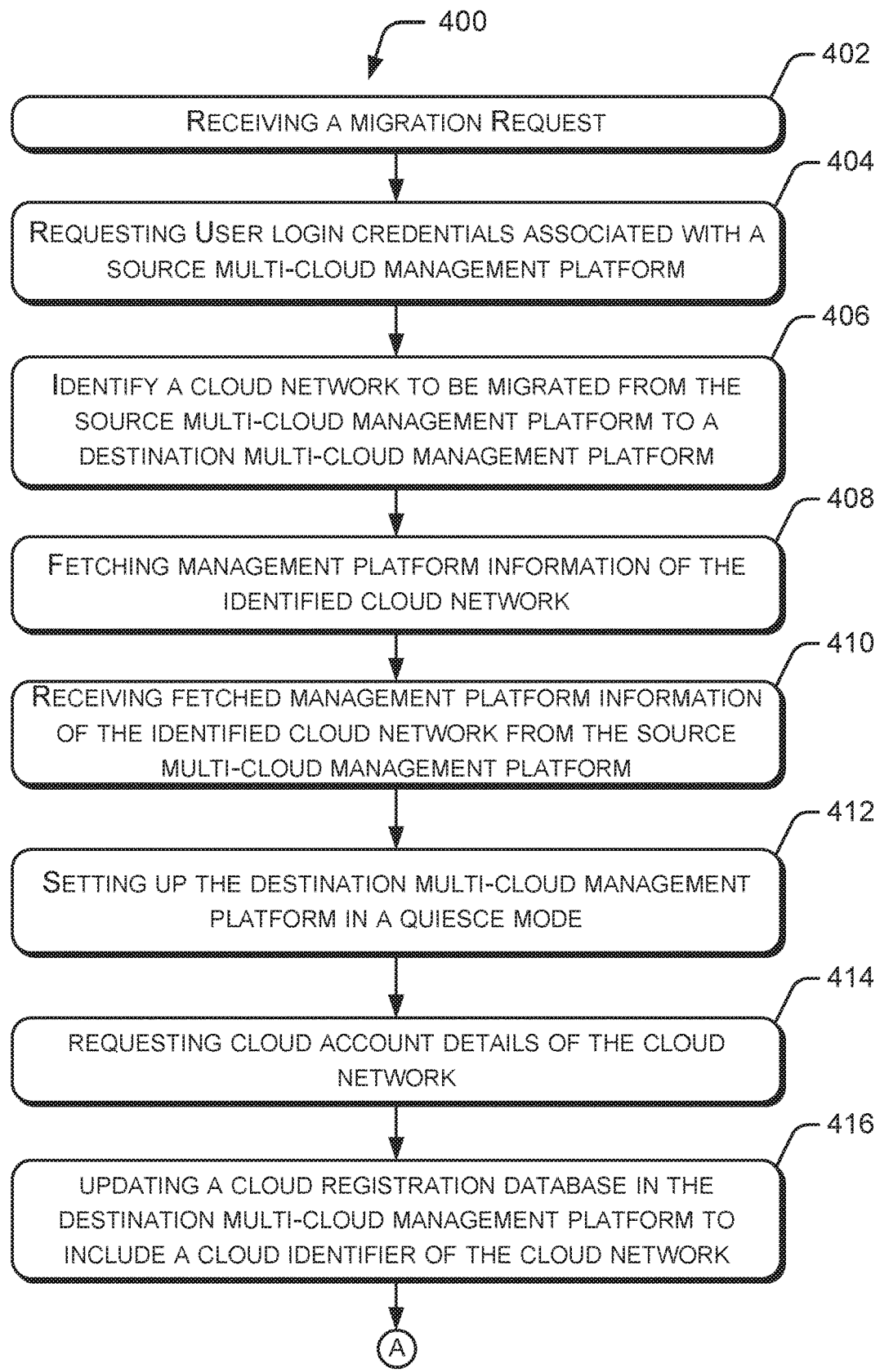
FIG. 4a illustrates a method for migration of a cloud network from a source multi-cloud management platform to a destination multi-cloud management platform, according to an example.

FIG. 4a illustrates a method 400 for migration of a cloud network from a source multi-cloud management platform to a destination multi-cloud management platform, according to an example. The method 400 enables migration of a cloud network from a source multi-cloud management platform, such as the source multi-cloud management platform 206, to a destination multi-cloud management platform, such as the destination multi-cloud management platform 208. The method 400 can be implemented by processing resource(s) or computing device(s) through any suitable hardware, a non-transitory machine readable medium, or combination thereof. In an example, step(s) of the method 400 may be performed by execution of computer-readable instructions, such as the migration instructions 216 which includes instructions stored on a medium and executable by a processing resource, such as the processor 102, of a system, such as the system 100 or 204. Further, although the method 300 is described in context of the aforementioned system 100 or 204, other suitable systems may be used for execution of the method 400. It may be understood that processes involved in the method 400 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

At block 402, a migration request is received at the destination multi-cloud management platform. The migration request is indicative of a source multi-cloud management platform from which a cloud network is to be migrated to a destination multi-cloud management platform. in response to receiving the migration request, user login credentials associated with the source multi-cloud management platform is requested, at block 404. The user login credentials are indicative of data for authenticating a user account in the source multi-cloud management platform. The source multi-cloud management platform is accessible through the user account.

At block 406, a cloud network to be migrated from the source multi-cloud management platform to the destination multi-cloud management platform may be identified based on a user input, such as a user selection. In response to the cloud network being identified management platform information associated with cloud network stored in the source multi-cloud management platform is fetched, at block 408. The management platform information is representative of policies and data associated with the cloud network stored in databases of the source multi-cloud management platform. The fetched management platform information is received by the source multi-cloud management platform, at block 410.

In response to the manage in response to obtaining the management platform information at the source multi-cloud management platform, the destination multi-cloud management platform is set up in a quiesce mode, at block 412. In the quiesce mode, requests related to deployment and modification of computing resources in the cloud network received at the destination multi-cloud management platform are paused from being processed. At block 414, cloud account details of the cloud network are requested. The cloud account details are indicative of data for authentication of a user account through which computing resources of the cloud network is accessible. At block 416, a cloud registration database in the destination multi-cloud management platform is updated to include a cloud identifier of the cloud network. The cloud registration database is to store a list of cloud identifiers, each corresponding to one of a plurality of cloud networks managed by the destination multi-cloud management platform. Once the cloud identifier of the cloud network to be migrated is included in the cloud registration database of the destination multi-cloud management platform, the cloud network is registered with the destination multi-cloud management platform.

Figure 4B:
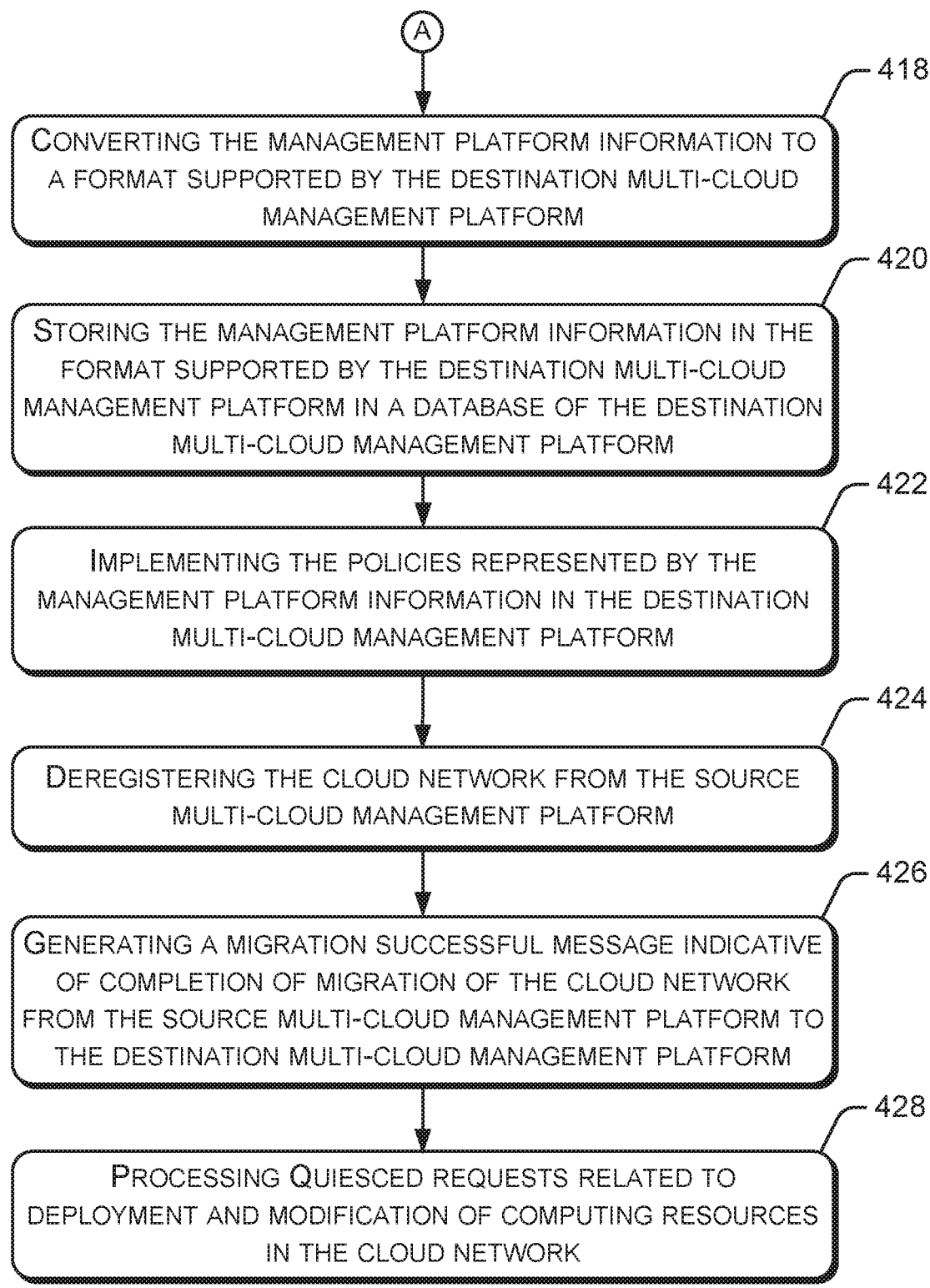
FIG. 4b illustrates further steps of the method illustrated in FIG. 4a according to an example.

With reference to FIG. 4b, in response to the cloud network being registered at the destination multi-cloud management platform, the management platform information may be converted to a format supported by the destination multi-cloud management platform, at block 418. At block 420, the management platform information is stored in a database of the destination multi-cloud management platform in the format supported by the destination multi-cloud management platform. In an example, the stored management platform information is associated with the migrated cloud network. At block 422, the policies represented by the management platform information are implemented in the destination multi-cloud management platform.

At block 424, the cloud network is deregistering from the source multi-cloud management platform. In an example, cloud identifiers associated with cloud network may be removed from a cloud registration database of the source multi-cloud management platform to deregister the cloud network. In response to the cloud network being deregistered from the source multi-cloud management platform, a migration successful message may be generated by the destination multi-cloud management platform, at block 426. The migration successful message is indicative of completion of migration of the cloud network from the source multi-cloud management platform to the destination multi-cloud management platform. After the migration is completed, and in response to the cloud network being deregistered from the source multi-cloud management platform, quiesced requests related to deployment and modification of computing resources in the cloud network are processed at the destination multi-cloud management platform, at block 428.

Figure 5:
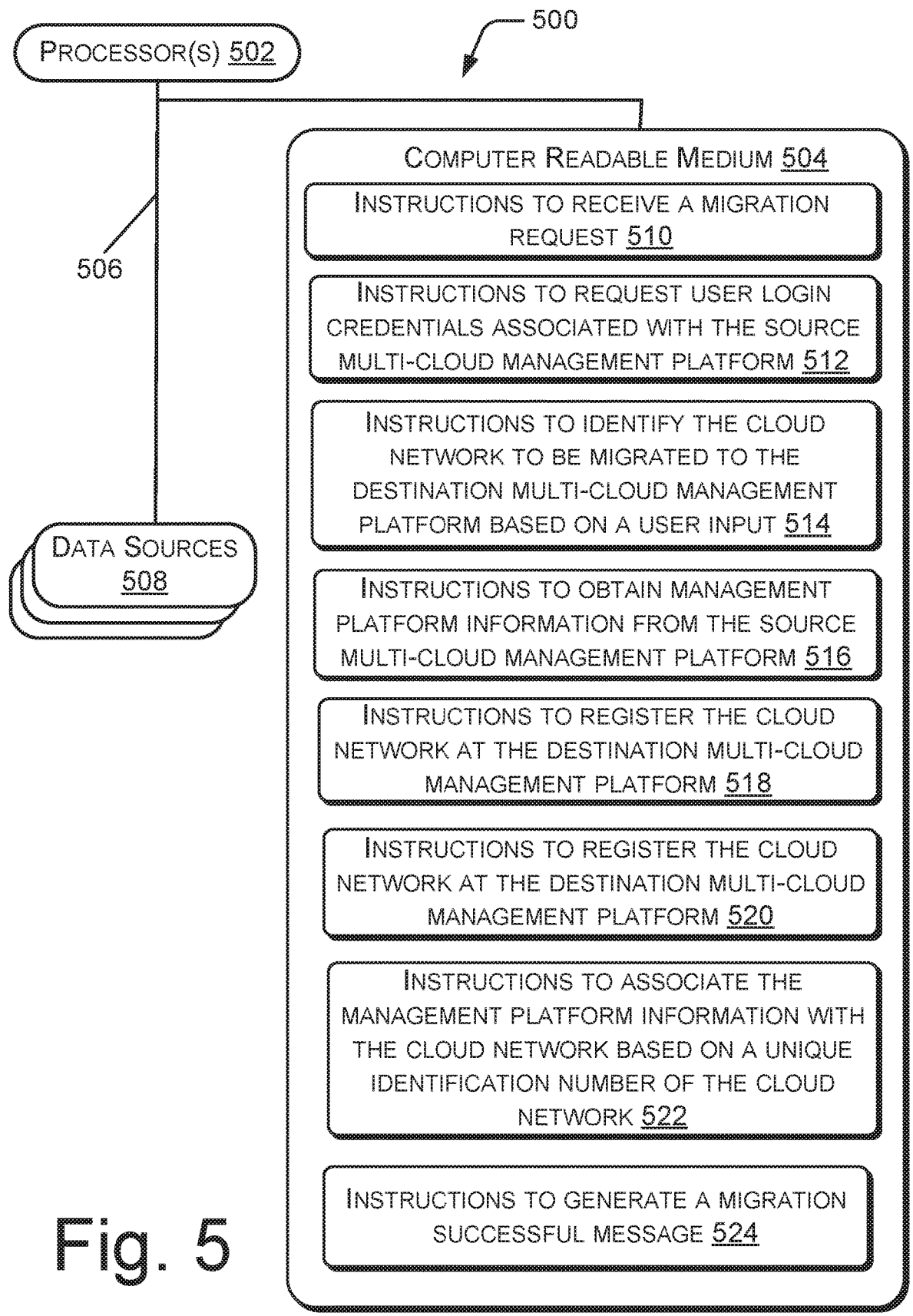
FIG. 5 illustrates a system environment implementing a non-transitory computer readable medium for migration of a cloud network between multi-cloud management platforms, according to an example.

FIG. 5 illustrates a system environment 500 implementing a non-transitory computer readable medium for migration of a cloud network between multi-cloud management platforms, according to an example.

In an example, the system environment 500 includes processor(s) 502 communicatively coupled to a non-transitory computer readable medium 504 through a communication link 506. In an example, the system environment 500 may be a computing system, such as the system 100 or 204. In an example, the processor(s) 502 may have one or more processing resources for fetching and executing computer-readable instructions from the non-transitory computer readable medium 504.

The non-transitory computer readable medium 504 can be, for example, an internal memory device or an external memory device. In an example implementation, the communication link 506 may be a direct communication link, such as any memory read/write interface.

The processor(s) 502 and the non-transitory computer readable medium 504 may also be communicatively coupled to data sources 508 over the network. The data sources 508 can include, for example, memory of the system, such as the system 100 or 204.

In an example implementation, the non-transitory computer readable medium 504 includes a set of computer readable instructions which can be accessed by the processor(s) 502 through the communication link 506 and subsequently executed to perform acts for migrating a cloud network, such as the cloud network A, from a source multi-cloud management platform, such as the source multi-cloud management platform 206, to a destination multi-cloud management platform, such as the destination multi-cloud management platform 208.

Referring to FIG. 5, in an example, the non-transitory computer readable medium 504 includes instructions 510 that cause the processor(s) 502 to receive a migration request. The migration request is indicative of a source multi-cloud management platform from which a cloud network is to be migrated to a destination multi-cloud management platform. The non-transitory computer readable medium 504 include instructions 512 that cause the processor(s) 502 to request user login credentials associated with the source multi-cloud management platform in response to the migration request being received. The user login credentials are indicative of data for authenticating a user account in the source multi-cloud management platform, where the source multi-cloud management platform is accessible through the user account.

The non-transitory computer readable medium 504 includes instructions 514 that cause the processor(s) 502 to identify the cloud network to be migrated to the destination multi-cloud management platform based on a user selection. The non-transitory computer readable medium 504 includes instructions 516 that cause the processor(s) 502 to obtain management platform information from the source multi-cloud management platform. The management platform information is representative of policies and data associated with the cloud network stored in databases of the source multi-cloud management platform.

In an example, the non-transitory computer readable medium 504 may include instructions that cause the processor(s) 502 to set up the destination multi-cloud management platform in a quiesce mode, in response to obtaining the management platform information. In the quiesce mode, requests related to deployment and modification of computing resources in the cloud network received at the destination multi-cloud management platform are paused from being processed.

Further, the non-transitory computer readable medium 504 includes instructions 518 that cause the processor(s) 502 to register the cloud network at the destination multi-cloud management platform. In an example, the non-transitory computer readable medium includes instructions that cause the processor(s) 502 to request cloud account details of the cloud network. The cloud account details are indicative of data for authentication of a user account through which computing resources of the cloud network is accessible. The non-transitory computer readable medium 504 includes instructions that cause the processor(s) 502 to update a cloud registration database in the destination multi-cloud management platform with a cloud identifier of the cloud network to register the cloud network in the destination multi-cloud management platform.

In an example, the non-transitory computer readable medium 504 may include instructions that cause the processor(s) 502 to convert the management platform information to a format supported by the destination multi-cloud management platform, in response to the cloud network being registered at the destination multi-cloud management platform. Further, the non-transitory computer readable medium 504 may include instructions that cause the processor(s) 502 to store the management platform information in the format supported by the destination multi-cloud management platform in a database of the destination multi-cloud management platform. The non-transitory computer readable medium 504 includes instructions 520 that cause the processor(s) 502 to associate the management platform information with the cloud network based on a unique identification number of the cloud network. In an example, the non-transitory computer readable medium 504 may include instructions that cause the processor(s) 502 to implement the policies represented by the management platform information in the destination multi-cloud management platform.

Further, the non-transitory computer readable medium 504 may include instructions 522 that cause the processor(s) 502 to deregister the cloud network from the source multi-cloud management platform. The non-transitory computer readable medium 504 may include instructions 524 that cause the processor(s) 502 to generate a migration successful message indicative of completion of migration of the cloud network from the source multi-cloud management platform to the destination multi-cloud management platform. In an example, the non-transitory computer readable medium 504 may include instructions that cause the processor(s) 502 to execute the requests related to deployment and modification of computing resources in the cloud network, in response to the cloud network being deregistered from the source multi-cloud management platform.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

I claim:

1. A method comprising:
receiving a migration request indicative of a source multi-cloud management platform from which a cloud network is to be migrated to a destination multi-cloud management platform;
identifying the cloud network to be migrated from the source multi-cloud management platform to the destination multi-cloud management platform based on a user input;
obtaining management platform information from the source multi-cloud management platform, wherein the management platform information is representative of policies and data associated with the cloud network stored in databases of the source multi-cloud management platform;
registering the cloud network at the destination multi-cloud management platform;
associating the management platform information with the cloud network based on a unique identification number of the cloud network; and
deregistering the cloud network from the source multi-cloud management platform.

2. The method as claimed in claim 1, further comprising:
in response to receiving the migration request, requesting user login credentials associated with the source multi-cloud management platform, the user login credentials being indicative of data for authenticating a user account in the source multi-cloud management platform, wherein the source multi-cloud management platform is accessible through the user account.

3. The method as claimed in claim 1, further comprising:
in response to obtaining the management platform information, setting up the destination multi-cloud management platform in a quiesce mode,
wherein, in the quiesce mode, requests related to deployment and modification of computing resources in the cloud network received at the destination multi-cloud management platform are paused from being processed.

4. The method as claimed in claim 3, further comprising processing the requests related to deployment and modification of computing resources in the cloud network, in response to the cloud network being deregistered from the source multi-cloud management platform.

5. The method as claimed in claim 1, further comprising:
in response to the cloud network being registered at the destination multi-cloud management platform, converting the management platform information to a format supported by the destination multi-cloud management platform;
storing the management platform information in the format supported by the destination multi-cloud management platform in a database of the destination multi-cloud management platform; and
implementing the policies represented by the management platform information in the destination multi-cloud management platform.

6. The method as claimed in claim 1, further comprising:
in response to the cloud network being deregistered from the source multi-cloud management platform, generating a migration successful message indicative of completion of migration of the cloud network from the source multi-cloud management platform to the destination multi-cloud management platform.

7. The method as claimed in claim 1, wherein registering the cloud network in the destination multi-cloud management platform comprises:
   requesting cloud account details of the cloud network, the cloud account details indicative of data for authentication of a user account through which computing resources of the cloud network is accessible; and
   updating a cloud registration database in the destination multi-cloud management platform to include a cloud identifier of the cloud network, wherein the cloud registration database is to store a list of cloud identifiers, each corresponding to one of a plurality of cloud networks managed by the destination multi-cloud management platform.

8. A system for migration of a cloud network between multi-cloud management platforms, comprising:
   a processor; and
   a memory coupled to the processor, the memory storing instructions, which when executed by the processor cause the processor to:
   receive a migration request, the migration request being indicative of a source multi-cloud management platform from which a cloud network is to be migrated to a destination multi-cloud management platform;
   identify, based on a user selection, the cloud network to be migrated to the destination multi-cloud management platform;
   obtain management platform information from the source multi-cloud management platform, wherein the management platform information is representative of policies and data associated with the cloud network stored in databases of the source multi-cloud management platform;
   request cloud account details of the cloud network, the cloud account details indicative of data for authentication of a user account through which computing resources of the cloud network is accessible;
   update a cloud registration database in the destination multi-cloud management platform with a cloud identifier of the cloud network to register the cloud network in the destination multi-cloud management platform;
   associate the management platform information with the cloud network based on a unique identification number of the cloud network; and
   deregister the cloud network from the source multi-cloud management platform.

9. The system as claimed in claim 8, wherein the cloud registration database is to store a list of cloud identifiers, each corresponding to one of a plurality of cloud networks managed by the destination multi-cloud management platform.

10. The system as claimed in claim 8, wherein the instructions further cause the processor to:
    request user login credentials associated with the source multi-cloud management platform in response to the migration request being received, the user login credentials being indicative of data for authenticating a user account in the source multi-cloud management platform, wherein the source multi-cloud management platform is accessible through the user account.

11. The system as claimed in claim 8, wherein the instructions further cause the processor to:
    set up the destination multi-cloud management platform in a quiesce mode, in response to obtaining the management platform information,
    wherein, in the quiesce mode, requests related to deployment and modification of computing resources in the cloud network received at the destination multi-cloud management platform are paused from being processed.

12. The system as claimed in claim 11, wherein the instructions further cause the processor to execute the requests related to deployment and modification of computing resources in the cloud network, in response to the cloud network being deregistered from the source multi-cloud management platform.

13. The system as claimed in claim 8, wherein the instructions further cause the processor to:
    convert the management platform information to a format supported by the destination multi-cloud management platform, in response to the cloud network being registered at the destination multi-cloud management platform;
    store the management platform information in the format supported by the destination multi-cloud management platform in a database of the destination multi-cloud management platform; and
    implement the policies represented by the management platform information in the destination multi-cloud management platform.

14. The system as claimed in claim 8, wherein the instructions further cause the processor to:
    generate a migration successful message indicative of completion of migration of the cloud network from the source multi-cloud management platform to the destination multi-cloud management platform, in response to the cloud network being deregistered from the source multi-cloud management platform.

15. A non-transitory computer-readable medium comprising computer-readable instructions for migration of a cloud network between multi-cloud management platforms, the computer-readable instructions when executed by a processor, cause the processor to:
    receive a migration request, the migration request being indicative of a source multi-cloud management platform from which a cloud network is to be migrated to a destination multi-cloud management platform;
    request user login credentials associated with the source multi-cloud management platform, the user login credentials being indicative of data for authenticating a user account in the source multi-cloud management platform, wherein the source multi-cloud management platform is accessible through the user account;
    identify the cloud network to be migrated to the destination multi-cloud management platform based on a user input;
    obtain management platform information from the source multi-cloud management platform, wherein the management platform information is representative of policies and data associated with the cloud network stored in databases of the source multi-cloud management platform;
    register the cloud network at the destination multi-cloud management platform;
    associate the management platform information with the cloud network based on a unique identification number of the cloud network;
    deregister the cloud network from the source multi-cloud management platform; and
    generate a migration successful message indicative of completion of migration of the cloud network from the source multi-cloud management platform to the destination multi-cloud management platform.

16. The non-transitory computer-readable medium as claimed in claim 15, wherein the computer-readable instructions when executed by the processor, further cause the processor to:
set up the destination multi-cloud management platform in a quiesce mode, in response to obtaining the management platform information,
wherein, in the quiesce mode, requests related to deployment and modification of computing resources in the cloud network received at the destination multi-cloud management platform are paused from being processed.

17. The non-transitory computer-readable medium as claimed in claim 16, wherein the computer-readable instructions when executed by the processor, further cause the processor to execute the requests related to deployment and modification of computing resources in the cloud network, in response to the cloud network being deregistered from the source multi-cloud management platform.

18. The non-transitory computer-readable medium as claimed in claim 15, wherein the computer-readable instructions when executed by the processor, further cause the processor to:
convert the management platform information to a format supported by the destination multi-cloud management platform, in response to the cloud network being registered at the destination multi-cloud management platform;
store the management platform information in the format supported by the destination multi-cloud management platform in a database of the destination multi-cloud management platform;
and
implement the policies represented by the management platform information in the destination multi-cloud management platform.

19. The non-transitory computer-readable medium as claimed in claim 15, wherein the computer-readable instructions to register the cloud network at the destination multi-cloud management platform, when executed by the processor, further cause the processor to:
request cloud account details of the cloud network, the cloud account details indicative of data for authentication of a user account through which computing resources of the cloud network is accessible; and
update a cloud registration database in the destination multi-cloud management platform to include a cloud identifier of the cloud network, wherein the cloud registration database is to store a list of cloud identifiers, each corresponding to one of a plurality of cloud networks managed by the destination multi-cloud management platform.

20. The non-transitory computer-readable medium as claimed in claim 15, wherein the source multi-cloud management platform and the destination multi-cloud management platform is hosted by different cloud service providers.

* * * * *